United States Patent [19]
Purcell et al.

[11] 3,826,325
[45] July 30, 1974

[54] TRACK SUSPENSION ASSEMBLY

[75] Inventors: Robert J. Purcell, Washington; Kenneth E. Wehr, Pekin, both of Ill.

[73] Assignee: Caterpillar Tractor Co., Peoria, Ill.

[22] Filed: Aug. 22, 1972

[21] Appl. No.: 282,699

[52] U.S. Cl................ 180/9.54, 180/9.2 R, 180/9.5, 305/22
[51] Int. Cl....................... B62d 55/10, B62d 55/30
[58] Field of Search.......... 280/5.22; 180/9.5, 9.2 R, 180/9.54, 9.52, 9.58; 305/29, 24, 30, 22, 27, 25, 28

[56] References Cited
UNITED STATES PATENTS

| | | | |
|---|---|---|---|
| 1,317,651 | 9/1919 | Holt | 180/9.58 |
| 1,376,648 | 5/1921 | Schneider | 180/9.2 R |
| 1,836,446 | 12/1931 | Christie | 180/9.2 R |
| 1,906,116 | 4/1933 | Smythe | 305/22 |
| 2,467,947 | 4/1949 | Skelton | 180/9.5 |
| 3,216,520 | 11/1965 | Blonsky | 180/9.54 |
| 3,595,333 | 7/1971 | Barbee | 305/28 X |

FOREIGN PATENTS OR APPLICATIONS

| | | | |
|---|---|---|---|
| 128,935 | 6/1932 | Austria | 180/9.58 |
| 748,216 | 5/1943 | Germany | 305/22 |
| 982,581 | 2/1965 | Great Britain | 305/22 |

*Primary Examiner*—Robert S. Ward, Jr.
*Assistant Examiner*—Reinhard J. Eisenzopf
*Attorney, Agent, or Firm*—Phillips, Moore, Weissenberger, Lempio & Strabala

[57] ABSTRACT

The track frame of a vehicle is pivotally mounted to the vehicle main frame and has crank members pivotally mounted to the opposite ends of the track frame. Each crank member has mounted thereon an idler and a bogey to which is fixed a pair of track rollers. These idlers and track rollers are engaged by a continuous track chain, and the track frame is supported at the crank member-track frame pivot points by means of the idlers and track rollers. Between the crank members are a pair of link members which are pivotally fixed to the track frame and extend toward each other. Each of these link members also has a bogey and track rollers mounted thereon, these track rollers being engaged by the track chain. Stop members and resilient pad means are associated with the crank members, link members, and track frame for proper support of the track frame, the particular placing of the crank member-track frame and link member-track frame pivot points being chosen for most efficient operation.

24 Claims, 5 Drawing Figures

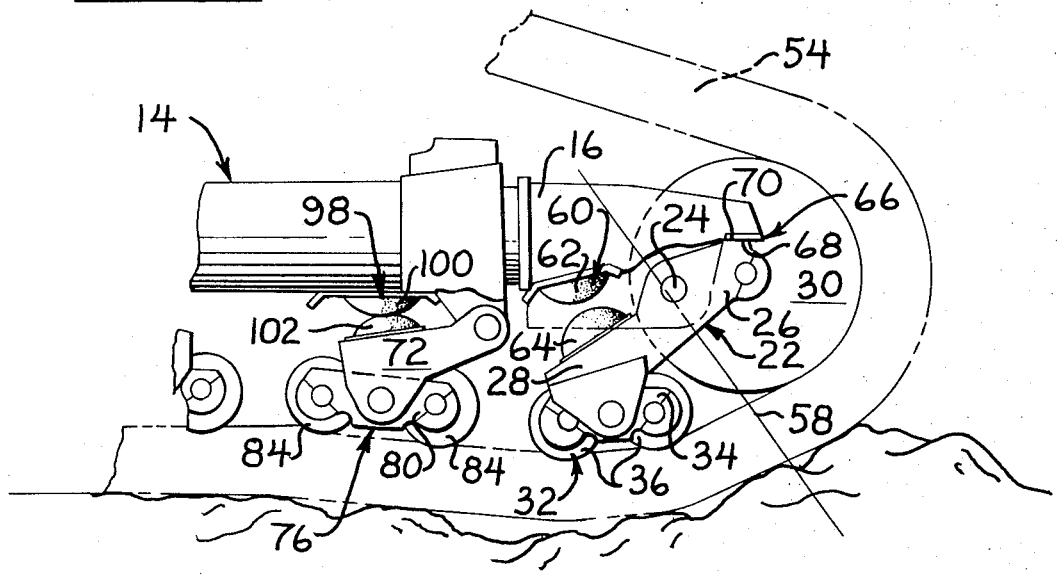
Fig-4-
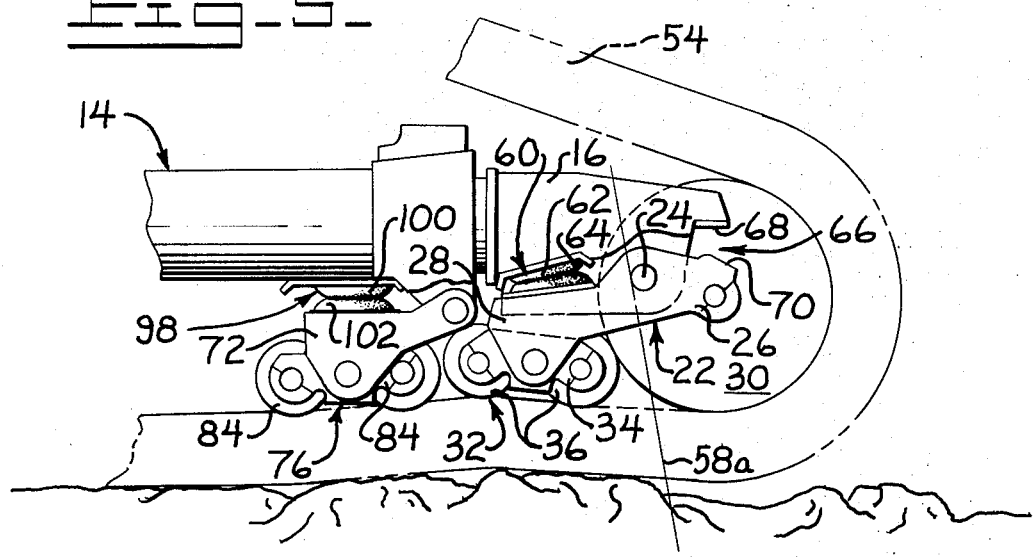
Fig-5-

TRACK SUSPENSION ASSEMBLY

BACKGROUND OF THE INVENTION

This invention relates to vehicle suspension systems, and more particularly to a suspension system which provides for proper movement of the elements thereof for smooth and efficient operation of the vehicle.

Vehicles of the track-type generally comprise a plurality of supporting track rollers rotatably fixed on track frames disposed on the sides of the vehicle. Rotatable members are generally fixed to the end portions of the track frames, and these idlers, along with the track rollers, engage endless tracks. See, for example, U.S. Pat. No. 3,435,908 to Sunderlin et al., U.S. Pat. No. 3,595,333 to Barbee, and U.S. Pat. No. 3,332,725 to Reinsma, all assigned to the assignee of this application.

In some cases, i.e., in the disclosures of Reinsma and Barbee, recoil means are associated with the front rotatable members of the vehicle. However, it has been found that in such relatively rigid systems, with little or no real suspension movement, good contact between the track chains and the ground is not maintained when the vehicle is negotiating relatively rough terrain. It would, therefore, be desirable to provide for proper suspension movement of the track rollers and rotatable members, meanwhile still providing proper carrying of the track frames, so that better track chain-ground engagement can be achieved over rough terrain.

Vehicles which generally incorporate means for allowing such suspension movement are shown in U.S. Pat. No. 3,063,510 to Hunger et al., and U.S. Pat. No. 3,254,738 to Larsen, both assigned to the assignee of this application. While these systems have been found relatively effective in operation, it should be noted that they are relatively complicated in design. It will be understood, of course, that it is always desirable to simplify the design of such a suspension system, meanwhile aiming for the most efficient manner of operation for proper traction, and also for maximum smoothness of operation.

Thus, the prior art suspension systems have generally incorporated relatively solidly mounted idlers and track rollers, or a relatively soft suspension through intermediate coiled springs or hydraulic cushioning of these elements. The former system provides a rigid platform on flat surfaces, but lacks adaptability to uneven terrain as well as not providing any relief for peak shock loads transmitted through the suspension. The latter, while generally permitting relief from shock loads and high speed vehicle travel, is excessively soft so that the suspension system is not stable with respect to the variable loading of implements attached to the vehicle such as a bulldozer blade or ripper.

SUMMARY OF THE INVENTION

It is an object of this invention to provide, in a track-type vehicle, a suspension system which provides that the tracks thereof maintain a high degree of contact with the ground, even when the vehicle is driven over relatively rough terrain.

It is a further object of this invention to provide such a suspension system in a track-type vehicle, the suspension system also providing for maximum smoothness of operation of the vehicle.

It is a still further object of this invention to provide in a track-type vehicle a suspension system which, while fulfilling the above objects, is simple in design.

It is a still further object of this invention to provide a track-type vehicle suspension system having improved adaptability to relatively fast traveling modes of operation over uneven terrain as well as to relatively slow speed, working modes of operation involving the variable loading of vehicle-mounted implements.

Broadly stated, the invention is in a vehicle having a vehicle frame, and comprises a suspension assembly. Such suspension assembly comprises a track frame mounted to the vehicle frame. A crank member is pivotally mounted at a point between the crank member ends to one end of the track frame, and has first and second legs extending from the pivot point. A first rotatable member is mounted to the first leg of the crank member. Roller means are mounted to the second leg of the crank member. A second rotatable member is mounted to the other end of the track frame. A track chain encompasses and is in contact with the first and second rotatable members and roller means, the crank member being disposed so that the one end of the track frame is supported at the crank member-track frame pivot point by means of the first rotatable member and roller means.

These and other objects of the invention will become apparent from a study of the following specification and drawings, in which:

FIGS. 4 and 5 are fragmentary views of the forward portion of the suspension system, showing the action of the elements as the vehicle is driven over various terrains.

DESCRIPTION OF THE PREFERRED EMBODIMENT

Figure 1:
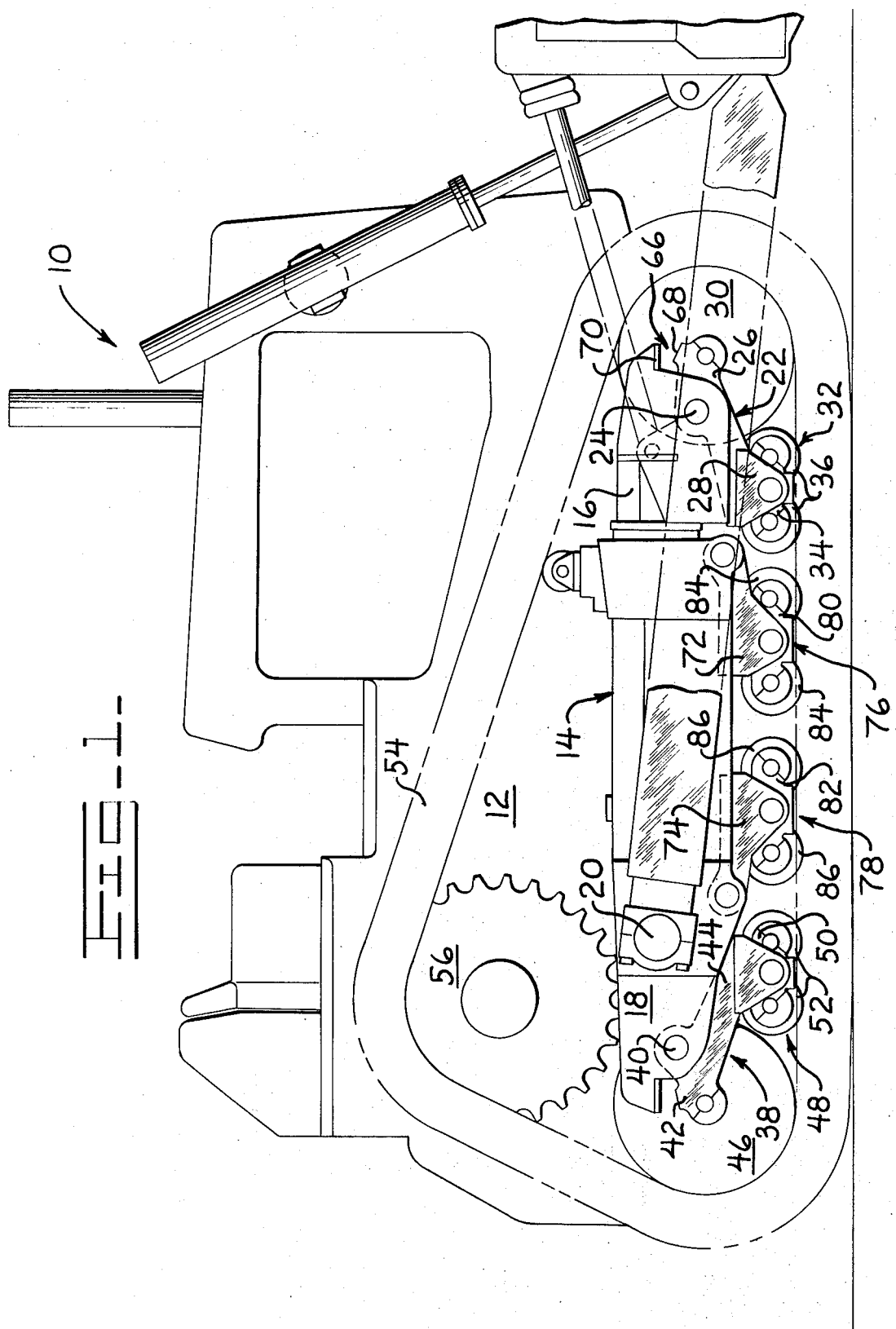
FIG. 1 is a side elevation of a vehicle incorporating the inventive suspension system.

Shown generally in FIG. 1 is a vehicle 10 having a vehicle frame 12. A track frame 14 includes one end 16, the forward end thereof, and the other end 18, the rearward end thereof, and is pivotally mounted between forward end 16 and rearward end 18 adjacent the rearward end 18 to the vehicle frame 12 by means of pin 20. A crank member 22 is pivotally mounted at point 24 between the crank member ends to end 16 of track frame 14. The crank member 22 has a leg 26 which extends generally forward away from end 18 of track frame 14, and a leg 28 which extends generally rearward toward the end 18. A rotatable member 30, in this embodiment an idler, is rotatably mounted on leg 26. Roller means 32 are mounted on the leg 28. Such roller means 32 comprise a bogey 34 pivotally mounted to the leg 28 and having track rollers 36 mounted thereon. Crank member 38 is pivotally mounted at point 40 between the crank member ends to end 18 of track frame 14. This crank member 38 has a leg 42 which extends generally rearwardly away from end 16 and a leg 44 which extends generally forwardly toward frame end 16. A rotatable member 46, in this embodiment also an idler, is rotatably mounted on the leg 42. Roller means 48 are mounted on the leg 44, and comprise a bogey 50 pivotally mounted to the leg 44 and having track rollers 52 mounted thereon.

A track chain 54 encompasses and is in contact with idlers 30, 46, and track rollers 36, 52, and a drive sprocket 56 mounted on vehicle frame 12 and positioned above and between the idlers 30, 46. The end 16 of track frame 14 is supported at pivot point 24 by the idler 30 and track rollers 36, which contact the ground-engaged track portion as shown. These elements define a support triangle for positive support of the end 16 without the use of springs or the like within the support triangle. This is so because pivot point 24 is above the ground-engaging track chain portion and between the points where the idler 30 engages the track and the point where the roller means 32 engage the track, providing great stability.

The end 18 of track frame 14 is supported by idler 46 and track rollers 52 in like manner.

With the crank members 22, 38 being pivotable about the pivot points 24, 40 respectively, it will be understood that movement of the type shown in FIGS. 4 and 5 can be achieved. An important feature of this invention is the relationship of the pivot point 24 and the "lines of action" 58, 58a shown. Such "lines of action" 58, 58a represent the resultant loading of the forces placed by the track chain 54 on the idler 30 and roller means 32. These are shown in FIGS. 4 and 5, and the direction thereof depends on the attitude of crank member 22. It will be noted that pivot point 24 is chosen as above the lines of action 58, 58a so that the crank member 22 is urged by such line of action to pivot leg 26 and idler 30 downwardly and leg 28 and roller means 32 upwardly. Upon such rotation, stop means 60 comprising resilient rubber pads 62, 64 of spherical shape mounted to the end 16 and leg 28 come into play, providing positive placement of the crank member 22 when rotated in this direction. It should also be noted that pivot point 24 is in close proximity to the lines of action 58, 58a, and to the bisector of the track chain 54 wrap angle on the idler so as to provide a minimum change in track chain 54 length, and to allow a relatively great amount of suspension travel, i.e., up and down travel of the idler 30 and roller means 32.

Stop means 66 are associated with the crank member 22 and end 16 to limit rotative movement of the crank member 22 which moves roller means 32 downwardly and idler 30 upwardly. Such stop means 66 comprise a stop member 68 formed on end 16 and a stop member 70 formed on leg 26 and adapted to contact stop member 68 upon such pivoting. Thus, positive stop means are provided for limiting rotative movement of crank member 22 in either direction.

It will be understood that crank member 38 and end 18 have similar stop pads and stop members associated therewith and operates in an identical manner, with leg 42 corresponding to leg 26, and leg 44 corresponding to leg 28.

A link member 72 is pivotally fixed at one end to the track frame 14 adjacent the idler 30 and inwardly of end 16. A link member 74 is pivotally fixed at one end to the track frame 14 adjacent the idler 46 and inwardly of the end 18. These link members 72, 74 extend generally toward each other from the respective link member-track frame pivot points thereof and have their extended ends in close proximity to each other. Roller assemblies 76, 78 are mounted on the link members 72, 74 respectively, and comprise bogies 80, 82 pivotally mounted to the link members 72, 74. Track rollers 84 are mounted on bogey 80, and track rollers 86 are mounted on bogey 82. The track chain 54 encompasses and is in contact with the roller assemblies 76, 78, being in engagement with track rollers 84 and 86.

It will be seen that the link members 72, 74 and rollers 84, 86 associated therewith are pivotable upwardly and downwardly relative to the track frame 14 independently of each other.

Figure 2:
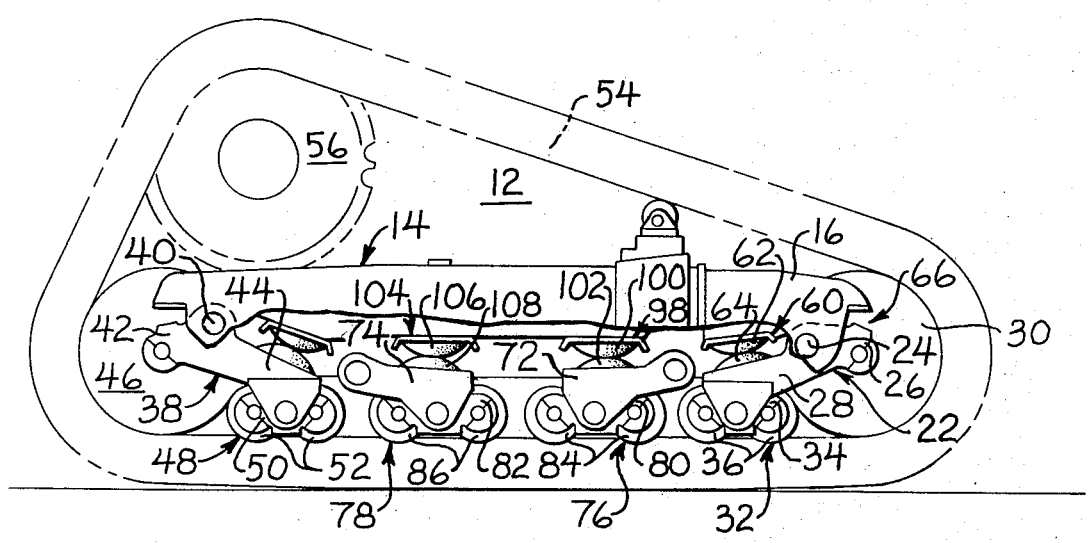
FIG. 2 is a side elevation of the track chain and suspension combination, with portions broken away.
Figure 3:
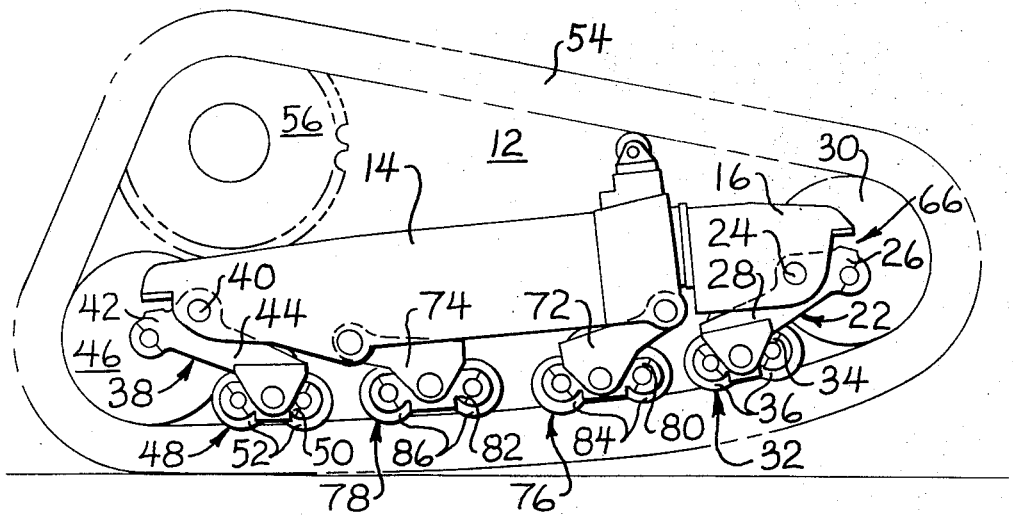
FIG. 3 is a view similar to that of FIG. 2, showing the action of the elements of the suspension system.

Stop means 98 (see FIG. 2) are associated with the link member 72 and the track frame 14. Such stop means 98 comprise resilient rubber pads 100, 102 of spherical shape mounted on the track frame 14 and link member 72, respectively, and positioned to contact each other upon upward pivoting of the link member 72, to limit such pivoting. Stop means 104 are associated with the link member 74 and track frame 14. Such stop means 104 also comprise resilient rubber pads 106, 108 of spherical shape mounted on the track frame 14 and link member 74 respectively, and positioned to contact each other upon upward pivoting of the link member 74, to limit such pivoting.

With the vehicle 10 in its normal, nonloaded situation, the vehicle weight is supported by crank member 22 (through the resilient pads 62, 64), crank member 38 (through the resilient pads associated therewith), link member 72 (through the resilient pads 100, 102), and link member 74 (through the resilient pads 106, 108), and of course like structure associated with a track on the other side of the vehicle 10. In such unloaded position, the idlers 30, 46 are normally carried in a slightly raised position, and are lowered only upon application of load. Under such load, because of the generally equal length of legs 26, 28, and legs 42, 44, the load on a crank member is divided roughly equally between the idler and the bogey associated therewith.

FIGS. 4 and 5 show clearly the operation of the suspension assembly. As the tractor chain 54 rolls over a combined dip and bump, leg 26 is pivoted upwardly and leg 28 is pivoted downwardly. Through such pivoting, proper contact between the forward portion of the track 54 and the ground is maintained. In addition, because of the dip, link member 72 pivots downwardly away from track frame 14, and is no longer a load-carrying member. However, it should be noted that with the downward travel of link member 72, track chain 54 has maintained good contact with the ground and the rollers 84 are still in guiding engagement with the track chain 54. In addition, link member 72 is properly positioned to move into a load-bearing position as the bump approaches the area thereof.

FIG. 5 shows a bump in a different position relative to the track chain 54. In such situation, both crank member 22 and link member 72 have been pivoted to bring their respective resilient stop menas into play. These stop means now transfer load to the track frame 14, the resiliency of the stop means meanwhile allowing proper track chain-ground contact to be maintained as shown.

The rear portion of the suspension assembly, of course, operates in a like manner.

In such operation, it is to be understood that a stable platform effect is maintained in combination with proper suspension movement. If the vehicle 10 is tilted forwardly by the loading of the implement mounted thereon for example, it will pivot generally about pivot point 24, and it will be seen that link member 22 pivots relative to track frame 14 so that idler 30 comes into play as a load bearing member. In this state, idler 30 and track rollers 36 support the load of the front end 16 through a gradually decreasing loading of the resilient members 62, 64 and gradually increasing direct mechanical loading of the controlling pivot point 24. In this way, a proper platform is maintained.

The rearward portion of the vehicle 10 operates in the same manner when the vehicle 10 is tilted rearwardly.

Such stable platform is maintained under all situations, as for example when the vehicle 10 is driven over a bump. In such case, with the idlers unloaded, the bump will be absorbed by the resilient means associated with link members 72, 74 and crank members 22, 38, i.e., the bump will be enveloped, with the stable platform being maintained. However, as soon as an idler is brought into play as a load bearing member, it along with the track rollers associated therewith is included to define such platform. Thus, while proper suspension travel is achieved, a stable vehicle platform exists under all conditions.

With the idler 30 and track rollers 36 being mounted on the same crank member 22, the entire front crank member 22 and structure associated therewith can be made to retract together if a recoil system is included in the apparatus. In such a recoil system, end 16 would be separate from end 18, and would be movable toward and away from end 18. With such a recoil system, a very stable end 16 support structure is provided, since the idler 30 and rollers 36 recoil (end 16 moves rearwardly) and move forwardly together.

The disclosed suspension system has proved extremely effective in providing smooth operation even over extremely rough terrain, and has proved quite superior in this regard to the prior designs tested. This is because of the novel crank member and link member system, the particular pivot points chosen, the stop means, and positions of the idlers, bogies, and track rollers, along with all associated structure, as described above. Because of such smooth operation, work can be carried out more rapidly with greater safety and less operator fatigue. In addition, it will be seen that such suspension system is extremely simple in design.

What is claimed is:

1. In a vehicle having a vehicle frame, a suspension assembly comprising: a track frame mounted to the vehicle frame; a crank member pivotally mounted at a point between the crank member ends to one end of the track frame, and having first and second legs extending from said pivot point; a first rotatable member mounted to the first leg of the crank member; roller means mounted to the second leg of the crank member; a second rotatable member mounted to the other end of the track frame; a track chain encompassing and in contact with the first and second rotatable members and roller means, the crank member being disposed so that the one end of the track frame is supported at the crank member-track frame pivot point by the first rotatable member and roller means, wherein the crank member-track frame pivot point is positioned above the line of action placed on the crank member by the track chain forces acting on the first rotatable member and roller means, wherein the crank member-track frame pivot point is positioned in close proximity to the line of action, and further comprising stop means associated with the crank member and track frame for limiting pivotal movement of the crank member in one direction under the track forces acting along said line of action.

2. The vehicle according to claim 1 wherein the stop means comprises resilient pad means associated with the crank member and track frame.

3. The vehicle according to claim 2 and further comprising additional stop means associated with the crank member and track frame for limiting pivotal movement of the crank member in the other direction.

4. The vehicle of claim 3 wherein the first rotatable member is an idler.

5. The vehicle of claim 4 wherein the roller means comprise a bogey pivotally mounted to the second leg of the crank member, and track rollers mounted to the bogey and engaging the track chain.

6. The vehicle of claim 5 wherein the track frame is pivotally mounted to the vehicle frame at a point between the ends of the track frame.

7. In a vehicle having a vehicle frame, a suspension assembly comprising: a track frame mounted to the vehicle frame; a first crank member pivotally mounted at a point between the first crank member ends to one end of the track frame and having a first leg extending generally away from the other end of the track frame, and a second leg extending generally toward the other end of the track frame; a first rotatable member mounted to the first leg of the first crank member; first roller means mounted to the second leg of the first crank member; a second crank member pivotally mounted at a point between the second crank member ends to the other end of the track frame and having a first leg extending generally away from the one end of the track frame, and a second leg extending generally toward the other end of the track frame; a second rotatable member mounted to the first leg of the second crank member; second roller means mounted to the second leg of the second crank member; a track chain encompassing and in contact with the first and second rotatable members and first and second roller means, so that one end of the track frame is supported at the first crank member-track frame pivot point by means of the first rotatable member and first roller means, and the other end of the track frame is supported at the second crank member-track frame pivot point by means of the second rotatable member and second roller means, and wherein the first crank member-track frame pivot point is positioned above the line of action placed on the first crank member by the track chain forces acting on the first idler and the first roller means, whereby the first crank member is urged by said line of action to pivot the first idler downwardly and the first roller means upwardly, and the second crank member-track frame pivot point is positioned above the line of action placed on the second crank member by the track chain forces acting on the second idler and second roller means, whereby the second crank member is urged by said line of action to pivot the second idler downwardly and the second roller means upwardly.

8. The vehicle of claim 7 wherein the first and second crank member-track frame pivot points are positioned in close proximity to the respective lines of action associated therewith.

9. The vehicle of claim 8 and further comprising first stop means associated with the first crank member and track frame for limiting pivotal movement of the first crank member moving the first idler downwardly and first roller means upwardly, and second stop means associated with the second crank member and track frame for limiting pivotal movement of the second crank member moving the second idler downwardly and second roller means upwardly.

10. The vehicle of claim 9 wherein the first and second stop means comprise resilient pad means associated with the first crank member and the track frame, and the second crank member and the track frame respectively.

11. The vehicle of claim 10 and further comprising first additional stop means associated with the first crank member and track frame for limiting pivotal movement of the first crank member moving the first idler upwardly and first roller means downwardly, and second additional stop means associated with the second crank member and track frame for limiting pivotal movement of the second crank member moving the second idler upwardly and second roller means downwardly.

12. The vehicle of claim 11 wherein the first and second roller means comprise first and second bogies pivotally mounted to the second legs of the first and second crank members respectively, and track rollers mounted to the first and second bogies and engaging the track chain.

13. The vehicle of claim 12 wherein the track frame is pivotally mounted to the vehicle frame at a point between the ends of the track frame.

14. In a vehicle having a vehicle frame, a suspension assembly comprising: a track frame mounted to the vehicle frame; first and second rotatable members mounted to one and to the other ends of the track frame respectively; a first link member pivotally fixed to the track frame adjacent the first rotatable member and inwardly of the one end of the track frame; a first roller assembly mounted to the first link member; a second link member pivotally fixed to the track frame adjacent the second rotatable member and inwardly of the other end of the track frame; a second roller assembly mounted to the second link member; and a track chain encompassing and in contact with the first and second rotatable members and first and second roller assemblies, and wherein the first and second roller assemblies comprise third and fourth bogies pivotally mounted to the first and second link members respectively, and track rollers mounted to the third and fourth bogies, the track rollers mounted to said third and fourth bogies contacting the track chain portion running between and under the first and second rotatable members, and wherein the first and second link members extend generally toward each other from the respective link member-track frame pivot points thereof, and have their extended ends in close proximity to each other, the first and second link members being upwardly and downwardly pivotable relative to the track frame independently of each other, and further comprising third stop means associated with the first link member and track frame, to limit upward pivoting of the first link member so that a portion of the vehicle weight may be supported through the first link member when said third stop means are in effect, and fourth stop means associated with the second link member and track frame to limit upward pivoting of the second link member so that a portion of the vehicle weight may be supported through the second link when said fourth stop means are in effect.

15. The vehicle of claim 14 wherein the third and fourth stop means comprise resilient pad means associated with the first and second link members and the track frame.

16. The vehicle of claim 15 and further comprising a first crank member pivotally mounted at a point between the first crank member ends to one end of the track frame and having a first leg extending generally away from the other end of the track frame, and a second leg extending generally toward the other end of the track frame, a second crank member pivotally mounted at a point between the second crank member ends to the other end of the track frame and having a first leg extending generally away from the one end of the track frame, and a second leg extending generally toward the other end of the track frame, said rotatable members being mounted to the first legs of the first and second crank members respectively, first roller means mounted to the second leg of the first crank member, second roller means mounted to the second leg of the second crank member, and a track chain encompassing and in contact with the first and second rotatable members and first and second roller means, so that the one end of the track frame is supported at the first crank member-track frame pivot point by means of the first rotatable member and first roller means, and the other end of the track frame is supported at the second crank member-track frame pivot point by means of the second rotatable member and second roller means.

17. The vehicle of claim 16 wherein the first and second rotatable members are idlers.

18. The vehicle of claim 17 wherein the first crank member-track frame pivot point is positioned above the line of action placed on the first crank member by the track chain forces on the first idler and the first roller means, whereby the first crank member is urged by said line of action to pivot the first idler downwardly and the first roller means upwardly, and the second crank member-track frame pivot point is positioned above the line of action placed on the second crank member by the track chain forces acting on the second idler and second roller means, whereby the second crank member is urged by said line of action to pivot the second idler downwardly and the second roller means upwardly.

19. The vehicle of claim 18 wherein the first and second crank member-track frame pivot points are positioned in close proximity to the respective lines of action associated therewith.

20. The vehicle of claim 19 and further comprising first stop means associated with the first crank member and track frame for limiting pivotal movement of the first crank member moving the first idler downwardly and first roller means upwardly, and second stop means associated with the second crank member and track frame for limiting pivotal movement of the second crank member moving the second idler downwardly and second roller means upwardly.

21. The vehicle of claim 20 wherein the first and second stop means comprise resilient pad means associated with the first crank member and the track frame, and the second crank member and the track frame respectively.

22. The vehicle of claim 21 and further comprising first additional stop means associated with the first crank member and track frame for limiting pivotal movement of the first crank member moving the first idler upwardly and first roller means downwardly, and second additional stop means associated with the second crank member and track frame for limiting pivotal movement of the second crank member moving the second idler upwardly and second roller means downwardly.

23. The vehicle of claim 22 wherein the first and second roller means comprise first and second bogies pivotally mounted to the second legs of the first and second crank members respectively, and track rollers mounted to the first and second bogies and engaging the track chain.

24. The vehicle of claim 23 wherein the track frame is pivotally mounted to the vehicle frame at a point between the ends of the track frame.

* * * * *